Oct. 19, 1943.                    E. W. RICKMEYER                    2,332,471
                                   CONTROL DEVICE
                              Filed May 29, 1940                2 Sheets-Sheet 1
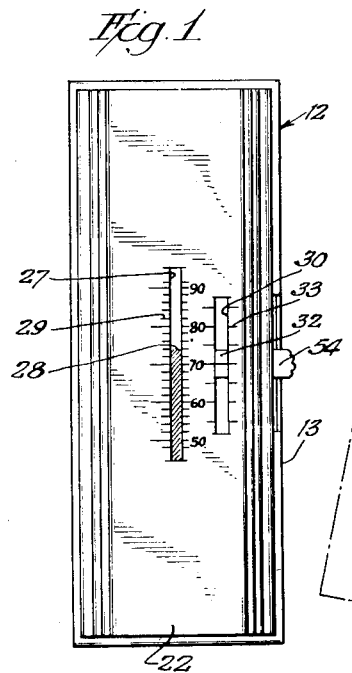
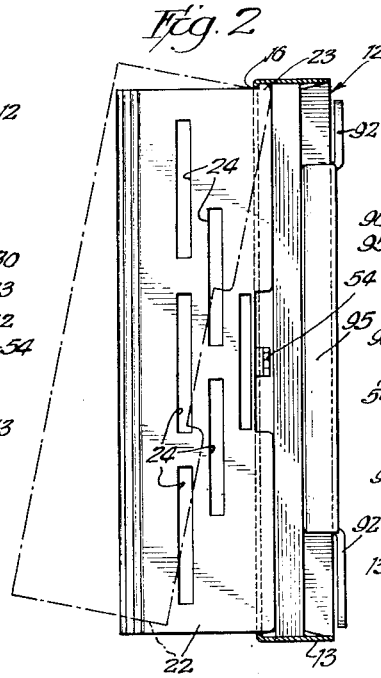
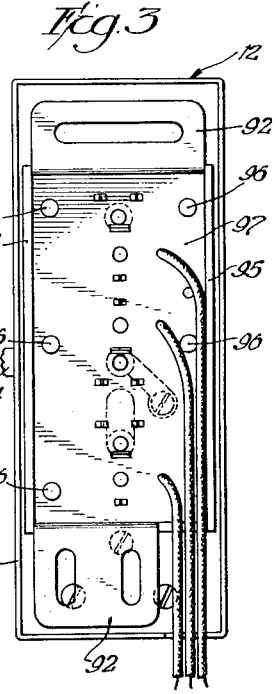
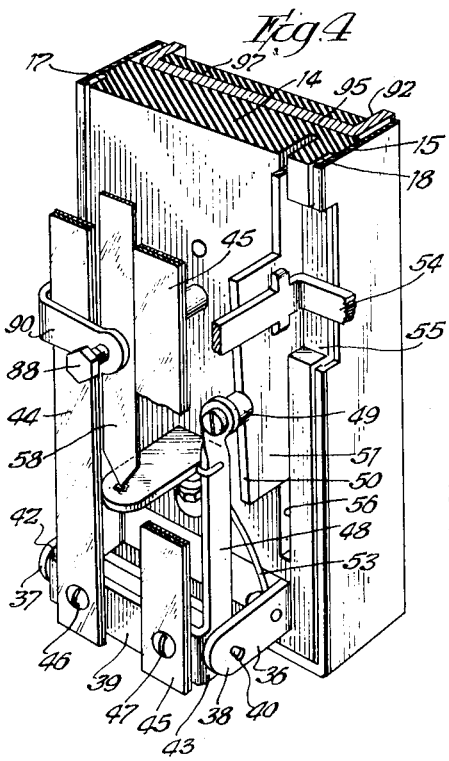
Inventors:
Ernst Walter Rickmeyer
Martin B. Grout
by H. Thrall Brewer
their Attorney Oct. 19, 1943.  E. W. RICKMEYER  2,332,471
CONTROL DEVICE
Filed May 29, 1940  2 Sheets-Sheet 2

Inventors:
Ernst Walter Rickmeyer
Martin B. Grout
BY
their Attorney

Patented Oct. 19, 1943

2,332,471

UNITED STATES PATENT OFFICE 2,332,471

CONTROL DEVICE

Ernst Walter Rickmeyer, Elmhurst, and Martin B. Grout, Chicago, Ill., assignors to Jefferson Electric Company, Bellwood, Ill., a corporation of Illinois Application May 29, 1940, Serial No. 337,894

13 Claims. (Cl. 200—139)

This invention relates to control devices, and more particularly to temperature responsive control devices for effecting temperature control by the actuation of switch contacts.

An object of this invention is to provide a temperature responsive control device which is constructed and arranged to minimize drift in the limits of the controlled temperature and thereby provides dependable control of temperature between limits which remain practically uniform and constant. Factors which contribute to the accomplishment of this object in the disclosed embodiment of this invention are the provision of a pair of separated, straight temperature responsive elements, the effective lengths of which remain substantially constant during operation and the use of metal or material in cooperating parts which has a low temperature coefficient of expansion.

Another object of this invention is to provide a temperature responsive control device which is effective to provide control within close temperature limits. Factors in the disclosed embodiment of this invention which contribute to the accomplishment of this object are the provision of temperature responsive means which are consistent in operation and operating characteristics, the reduction of heat conduction from the temperature responsive means, and accurate adjustments for the controlling elements.

Another object of this invention is to provide a temperature responsive control device having a plurality of adjustments for determining the average temperature setting and the differential between limits of temperature variation from said average; the adjustment for the average temperature being easily and quickly adjustable from outside the device and with reference to a calibrated scale.

Another object of this invention is to provide a temperature control device including means for changing the controlled temperature limits to values outside of the normal range of control for the temperature responsive elements without said means. In the disclosed embodiment of this invention, this object is accomplished by means comprising an adjustable element which may be adjusted to restrict and control the limits of movement of the movable portion of the temperature responsive element.

Another object of this invention is to provide a temperature responsive control device having a plurality of independently movable temperature responsive elements and means for coordinating the movements of said elements to operate a control instrumentality. In the disclosed embodiment of this invention, the coordination of movements of the temperature responsive elements is effected by means connecting movable portions of the temperature responsive elements and adapted to effect cooperation therebetween without binding or preventing desirable independent action thereof.

Another object of this invention is to provide a control device including features and advantages such as those set forth and which may be easily and cheaply manufactured in production quantities.

Other objects and advantages of this invention will be apparent from the following description and reference to the accompanying drawings wherein a preferred embodiment of our invention is clearly described and illustrated.

In the drawings:

Figs. 1, 2 and 3 are respectively front, side and back views of an assembled control device which comprises a preferred embodiment of this invention;

Fig. 4 is a fragmentary perspective view of a portion of a control device embodying a preferred form of this invention having some parts cut away so as to show more clearly the structural features thereof;

Fig. 5 is a front elevation of a part of the control device assembly shown in Figs. 2 and 3;

Fig. 6 is a fragmentary perspective view illustrating structural features of a portion of the control device which comprises a preferred form of this invention;

Figure 7:
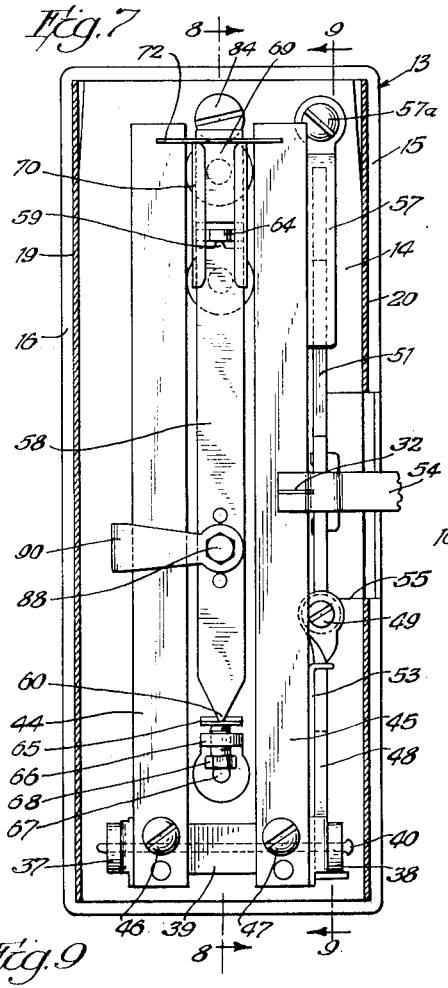
Fig. 7 is a front elevation of the control device shown in Fig. 1 with the cover cut away to show the internal construction of the device.

Having particular reference to the drawings, a control device 12 has a base 13 including a block of insulating material 14 and a rim or bezel 15 of metal which fits over and covers the edges of the block of insulating material 14. The rim or bezel 15 has a flanged edge 16 adjacent the front side of the insulating block 14. The edges of the front side of the insulating block 14 are cut away at 17 and 18 to provide slots into which the sides 19 and 20 of a cover 22 fit. Integral lugs such as 23 at one end of the cover 22 fit under the flange 16 in the slots 17 and 18 to assist in holding the cover in place.

The ends of the cover 22 are preferably open to permit the circulation of air through the cover from end to end. Louvers or openings such as 24 are also preferably provided in the sides of the cover to permit the circulation of air therethrough as a result of side drafts. A thermometer 26 is secured to the inner surface of the cover 22 adjacent a slot 27 in the cover through which the mercury or indicating medium 28 of the thermometer is visible. A temperature scale 29 is preferably marked on the outer surface of the cover adjacent the slot 27 and in cooperative relation with the thermometer for providing an indication of the room temperature. A second slot 30 in the cover 22 is preferably located adjacent the slot 27 and provides a window through which an indicating element 32 is visible. A temperature scale 33 is preferably provided adjacent slot 30 which corresponds to and is in alignment with the temperature scale 29. The thermometer 26 is held in position by a cover or clamp means 34 which is secured to the inner surface of the cover 22 by screws or fastening means 35.

A substantially U-shaped bracket 36 is secured to the insulating block 14 near one end thereof and has outwardly extending legs 37 and 38. A second bracket part 39 is rotatably secured to the bracket 36 by a pin or shaft 40 which extends through the legs 37 and 38 and through ears 42 and 43 on the second bracket part 39. The brackets 36 and 39 provide a hinge support for one end of each of two substantially parallel temperature responsive elements or bimetallic strips 44 and 45; these temperature responsive elements or bimetallic strips being secured to the rotatably supported bracket 39 by screws or fastening means 46 and 47 respectively. The temperature responsive elements or bimetallic strips 44 and 45 extend along the base 13 in spaced and approximately parallel relation thereto and have their broader sides facing the base so that their normal flexures due to temperature changes are toward and away from the base. The second bracket part 39 is provided with an integral arm 48 for determining and adjusting the position of that bracket part and the normal position of the temperature responsive elements 44 and 45; an adjustable foot 49 on the arm 48 being held in position against a camming surface 50 by a spring 53 which has one end anchored to the legs 38 of the bracket 36.

A manually operable handle 54 extends outwardly through a recess 55 on one side of the base 13 and is secured to a cam 51 to provide easily accessible and exposed means for adjusting the position of the cam 51 and the normal position of the temperature responsive elements, 44 and 45. The indicating element 32 is preferably integral with the handle 54 so that the adjusted position is indicated on the temperature scale 33. The cam 51 is slidably supported in a slot 56 in the insulating block 14; one end being held in the slot by the force of the spring 53 on the arm 48 and the other end being held in the slot by a leaf spring 57 which is anchored at one end to the insulating block 14 by a screw or fastening means 57a.

The temperature responsive elements or bimetallic strips 44 and 45 are preferably spaced apart and a resilient contact carrying spring 58 is preferably disposed between the bimetallic strips and supported in practically parallel relation thereto. The contact carrying spring 58 has integral pointed bearings 59 and 60 which are mounted in cooperating recesses 62 and 63 respectively in support brackets 64 and 65 respectively. The support brackets 64 and 65 are secured to the insulating block 14. The bracket 64 is substantially rigid, while the bracket 65 is resilient. A second bracket 66 is secured to the insulating block 14 adjacent the bracket 65 by a screw or fastening means 67 and provides a threaded support for an adjusting screw 68 which abuts the bracket 65 to provide an adjustable control for the position of the bracket 65. The position of the bracket 65 controls the warping or normal position of the portion of the contact carrying spring 58 which extends between the brackets 64 and 65. The adjustment of the bracket 65 is normally such that the contact carrying spring 58 is normally warped and consequently moves with snap action to positions on opposite sides of a center line. A portion 69 of the contact carrying spring 58 extends beyond the bracket 64 and is strengthened and made more rigid by a plate 70 having its edges folding over the contact carrying spring to hold it in position.

A yoke 72 provides a link for connecting the extending portion 69 of the contact carrying spring to the free or extending ends of the temperature responsive elements 44 and 45. The yoke 72 preferably has an opening 73 therethrough into which the extending end 69 of the contact carrying spring 58 fits tightly, so that by staking or other suitable means, the yoke is secured to the end of the contact carrying spring. The contact carrying spring 58 is preferably made of resilient material, having a low temperature coefficient of expansion so that the yoke remains in a substantially fixed position with respect to the other parts of the control device irrespective of the temperature changes. The ends of the yoke are preferably bifurcated at 74 and 75, or somewhat C-shaped as shown in Fig. 6, and the extending ends of the temperature responsive elements extend through the bifurcations. Each of the bifurcated ends preferably has rounded tips such as 76 and 77 and 78 and 79 on opposite sides of the respective temperature responsive elements which are adapted to engage those elements in their movement in either direction. The tips of the bifurcated ends are sufficiently spaced that the temperature responsive elements fit loosely therebetween and the expansion or contraction of the temperature responsive elements does not tend to shift the position of the yoke. The spacing is however, sufficiently close that there is no lost motion or play in the movement of the temperature responsive elements which will impair the accuracy of the adjustments of the device. The oppositely disposed rounded tips 76 and 77 and 78 and 79 reduce the area of contact of the yoke with the temperature responsive elements to reduce the conduction of heat away from the temperature responsive elements and also prevent binding or undue resistance to movement which might be effected by imperfect matching of the temperature responsive elements and the consequent tendency of one temperature responsive element to move at a different rate or to a different position as a result of a temperature change.

An opening 80 is provided in an extending mid-portion 82 of the yoke 72. A screw 83 is threaded into the base 13 in a position such that one side of the screw head 84 extends into the opening 80. The size of the opening 80 is such that a predetermined amount of free movement of the yoke due to flexure of the temperature responsive elements, may take place in one direction or the other before the yoke 72 engages the screw head. It is apparent however, that the adjustment of the screw 83 will alter the limits of movement of the temperature responsive elements and yoke. This provides means of extending the normal temperature range of the temperature responsive elements by providing an adjustment of the normal positions of the temperature responsive elements and the limits of movement from the normal portions.

Contacts 85 and 86 are secured to opposite sides of the contact carrying spring 58 intermediate the support brackets 64 and 65. These contacts 85 and 86 are in alignment for engagement with adjustably supported stationary contacts 87 and 88 respectively; the contact 87 being threaded into a support post 89 which is secured to the base 13 and the contact 88 being threaded into a support bracket 90 which is secured to the base 13. The adjustable contacts 87 and 88 are spaced with respect to the contacts 85 and 86 and the normally warped contact carrying spring 58 so that the movement of the temperature responsive elements 44 and 45 effects snap movement of the contacts 85 and 86 from engagement with one of the respective contacts 87 and 88 to the other.

Figure 8:
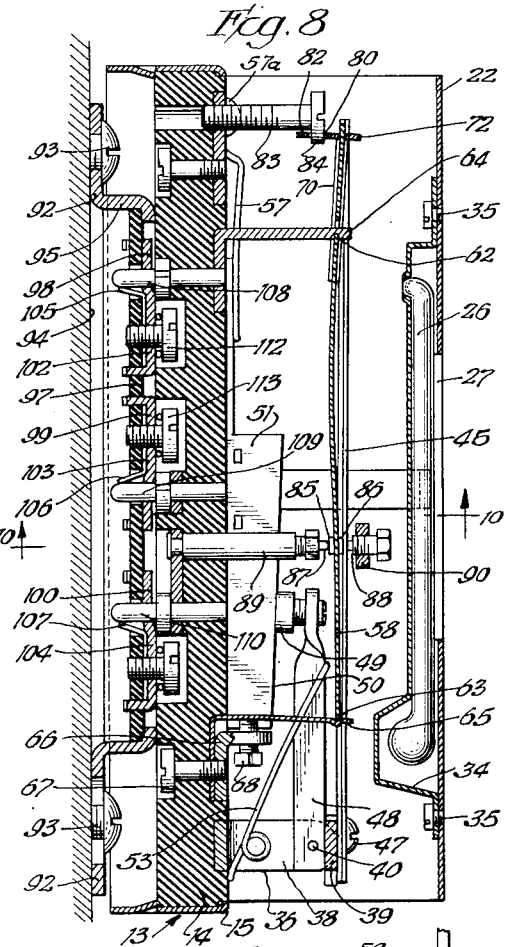
Fig. 8 is a side sectional view with the section taken substantially on a line 8—8 of Fig. 7 and looking in the direction of the arrows.
Figure 9:
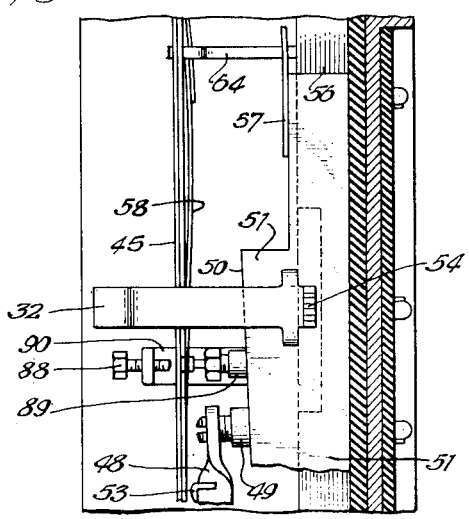
Fig. 9 is a fragmentary side sectional view with the section taken substantially on a line 9—9 of Fig. 8 and looking in the direction of the arrows.
Figure 10:
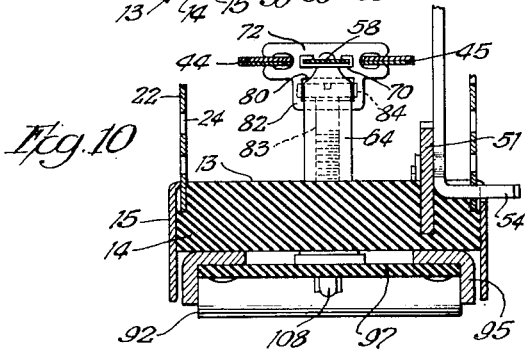
Fig. 10 is a fragmentary sectional view with the section taken substantially on a line 10—10 of Fig. 8 and looking in the direction of the arrows.

In the preferred embodiment of this invention, the control device preferably has the described unitary structure secured to the base 13 and is detachably mounted on an auxiliary base 92 which is secured by screws or fastening means 93 to a wall or permanent support which is indicated at 94 in Figure 8. The auxiliary support 92 includes a flanged metal support rim 95 to which is secured by rivets or fastening means 96 an auxiliary insulating base 97. Connecting jacks 98, 99 and 100 comprising apertured connecting terminals 102, 103 and 104 having resilient contact springs 105, 106 and 107 respectively, are insulatingly supported by the auxiliary insulating base 97. The connecting terminals 102, 103 and 104 have openings therein for receiving connecting plugs 108, 109 and 110 respectively, and are respectively provided with terminal screws 112, 113 and 114 for making electrical connections to the connecting terminals. The connecting plugs 108, 109 and 110 are secured to the insulating block 14 on the base 13 of the control device. The connecting plug 108 is electrically connected to the support bracket 64 and through that bracket to the contact carrying spring 58. The connecting plug 109 is electrically connected to the support bracket 90 and through that bracket to the adjustable contact 88. The connecting plug 110 is electrically connected to the support 89 and through that support post to the adjustable contact 87. The connecting plugs 108, 109 and 110 removably engage the resilient contact springs 105, 106 and 107 respectively, to provide electrical connections from the control device to the circuit to be controlled thereby.

In the adjustment of the disclosed control device, the spring tension or normal warp of the contact carrying spring 58 is adjusted by the adjustment of the position of the adjusting screw 68 to control the contact pressure and also to control the differential between the limiting temperatures at which the device switches the connections from one of the stationary contacts 87 or 88 to the other. The contact pressure is, of course, dependent upon the spacing of contacts 87 and 88 as well as upon the tension of the contact carrying spring 58 due to the adjustment of the adjusting screw 68. The temperature differential is dependent upon the tension of the contact carrying spring 58 because that differential controls the force which must necessarily be applied to the contact carrying spring by the temperature responsive elements 44 and 45. Since the adjustment of the distance between the contacts 87 and 88 controls the necessary movement of the contact carrying spring 58 the adjustment of that spring tension somewhat compensates for spring tension adjustments as well as controlling the temperature differential. The size of the opening 80 in the extension 82 on the yoke 72 is preferably so proportioned with respect to the thickness of the screw head 84 that the engagement of the yoke with that screw head prevents the yoke from rocking to an extent which will cause the contacts to move from one position of rest to the other, due to the operation or action of one of the temperature responsive elements. The adjustment of the screw 83 and the proportionate dimensions of the screw head 84 with respect to the opening 80 also controls the over-travel of the temperature responsive elements. The adjustment of the screw 83 provides a means of adjustment of a given control device by controlling the limits of movement of the temperature responsive element as previously mentioned.

In the operation of this control device, the device is removably secured to a wall of a room where the temperature is to be controlled. When thus mounted the temperature responsive elements 44 and 45 are preselected to provide control within the desired temperature limits, and the various adjustable elements of the switch are adjusted to provide elements of control within, and in agreement with range of the temperature scale 33, as well as to provide the predetermined differential between the temperatures at which the switching operations of the device occur. Although it is preferable that the two temperature responsive strips 44 and 45 have identical characteristics, the variations which normally occur in the production of such bimetallic strips sometimes effect variations in the characteristics of those strips. This variation in the strips and the variation in air circulation through a housing such as that provided makes the pair of strips desirable for the accomplishment of uniform characteristics between control devices and uniform operation of a control device under different operating conditions. The normal position of these temperature responsive elements is adjusted to provide a predetermined average or mean temperature by adjustment of the manually operable handle 54.

In the normal position of the temperature responsive elements, one set of contacts such as 85 and 87 are biased into engagement by the normal resilience and warping of the contact carrying spring 58. Upon flexure of the temperature responsive elements, due to a temperature change, the projecting portion 69 of the contact carrying spring is actuated to effect flexure of the warped portion thereof and consequent shift of the contacts and the breaking of the contacts 85 and 87 and making of the contacts 86 and 88 or vice versa. The contact movement occurs with snap action because of the warping and resilience of the contact carrying spring 58.

From the foregoing description and the reference to the drawings, it will be apparent that the following are examples of the advantages accomplished by certain features of the construction of the disclosed control device:

(1) Drift from the temperature to which the device is normally adjusted is minimized by structure including the two normally straight bimetallic strips which are connected by a yoke in such a way that the effective length of the strips remains substantially constant because of the anchoring of the yoke to an element of the device which has a low temperature coefficient of expansion.

(2) Close limits of adjustment are obtained and maintained by the use of structure including straight bimetallic strips having constant effective length and only small surface contact of other elements of the device with the bimetallic strips.

(3) The device is easily removable from its mounted position for replacement or readjustment because of the provision of structure including the auxiliary base and removable plug and jack connections which support the control device and establish electrical connections thereto.

(4) Circulation of air through the cover for the device and around the temperature responsive elements is improved by the open ends of the cover and the provision of side openings or louvers therein.

(5) The common temperature scale for the thermometer and the indicating element for the adjustment facilitates the adjustment of the device and the comparison of the adjustment with the indicated temperature.

(6) The range of temperatures to which the control device is capable of adjustment is greatly increased by the provision of the adjusting screw which cooperates with the yoke connecting the bimetallic strips and controls limits of movement or even the normal position or stress of the temperature responsive strips.

While the embodiment of the present invention as herein disclosed, constitutes a preferred form, it is to be understood that other forms might be adopted, all coming within the scope of the claims which follow.

What is claimed is:

1. A control device comprising, in combination, a base, a pair of spaced bimetallic temperature responsive elements spaced from and extending along the base, hinge support means secured to the base and having one end of each of the bimetallic temperature responsive elements anchored thereto, cam means slidable with respect to the base and having indicating means thereon, an arm biased toward the cam means and secured to the portion of the hinge support means to which the bimetallic temperature responsive elements are anchored so that movement of the cam means controls the position of the bimetallic temperature responsive elements, a calibrated scale adjacent said indicating means for providing an indication of the position of the bimetallic temperature responsive elements, a normally warped resilient contact carrying spring supported from the base adjacent the bimetallic temperature responsive elements and having a projecting end portion, adjustable stationary contacts, contacts mounted on the contact carrying spring in alignment for engagement with the stationary contacts, and a yoke connecting the unanchored ends of the bimetallic temperature responsive elements to the projecting end portion of the contact carrying spring so that movement of the bimetallic temperature responsive elements effects movements of the said contacts on the contact carrying spring with snap action.

2. A control device comprising, in combination, a base, a pair of bimetallic temperature responsive elements spaced from and extending along the base, means adjustably securing one end of each of the temperature responsive elements to the base, cam means adjustable with respect to the base, means controlled by the position of the cam means for adjusting the positions of the adjustably mounted ends of the temperature responsive elements, a normally warped resilient contact carrying spring supported adjacent the temperature responsive elements for flexing movement and having a projecting end portion, adjustable stationary contacts, contacts mounted on the contact carrying spring in alignment for engagement with the stationary contacts, and a yoke connecting the unanchored ends of the temperature responsive elements to the projecting end portion of the contact carrying spring so that movement of the temperature responsive elements effects movements of said contact carrying spring and contacts with snap action.

3. A control device comprising, in combination, a base, a pair of bimetallic temperature responsive strips which are normally practically straight, said strips having adjacent ends anchored with respect to the base and extending in substantially parallel relation with the extending ends adapted to move upon flexure of the strips, a normally warped resilient contact actuating spring having a low temperature coefficient of expansion supported for flexing movement and having a projecting end portion, a stationary contact mounted adjacent the contact actuating spring, a movable contact actuated by the contact actuating spring, said movable contact being in alignment for engagement with the stationary contact, and yoke means connecting the extending ends of the bimetallic temperature responsive strips to the projecting end portion of the resilient contact actuating spring so that movement of the temperature responsive strips effects movements of said contact actuating spring and movable contact with snap action, said yoke means being movably connected to the bimetallic strips and secured in position on the projecting end portion of the contact actuating spring.

4. A control device comprising, in combination, support means, a pair of bimetallic temperature responsive strips having adjacent ends anchored with respect to the support means and their other ends extending in the same direction and adapted to move upon flexure of the strips, means for manually adjusting the normal positions of the bimetallic strips, a stationary contact, a movable contact in alignment for engagement with the stationary contact, and means effecting movement of the movable contact with snap action in response to flexure of the bimetallic strips, said last mentioned means including a connecting element fixed in position with respect to said last mentioned means and movably engaging the bimetallic strips.

5. A control device comprising, in combination, support means, a pair of bimetallic temperature responsive strips having adjacent ends anchored with respect to the support means and their other ends extending in the same direction and adapted normally to flex in the same direction due to a temperature change, a stationary contact, a movable contact in alignment for engagement with the stationary contact, and means effecting movement of the movable contact with snap action in response to flexure of the bimetallic strips, said last mentioned means including a connecting element fixed in position with respect to the said last mentioned means and movably engaging the bimetallic strips.

6. A control device comprising, in combination, support means, a pair of bimetallic temperature responsive strips having adjacent ends anchored with respect to the support means and their other ends extending in the same direction and adapted normally to flex cooperatively in the same direction due to a temperature change, means for manually adjusting the normal positions of the bimetallic strips, a stationary contact, a movable contact in alignment for engagement with the stationary contact, means effecting movement of the movable contact with snap action in response to flexure of the bimetallic strips, and adjustable means for determining the limits of movement of the movable ends of the strips.

7. A control device comprising, in combination, a base, a bimetallic temperature responsive strip which is normally practically straight, said strip being anchored with respect to the base and having an extending portion adapted to move upon flexure of the strip, a normally warped resilient contact actuating spring having a low temperature coefficient of expansion supported for flexing movement and having a projecting end portion, a stationary contact mounted adjacent the contact actuating spring, a movable contact actuated by the contact actuating spring, said movable contact being in alignment for engagement with the stationary contact, and yoke means providing an actuating connection between the extending portion of the bimetallic temperature responsive strip and the projecting end of the contact actuating spring so that movement of the temperature responsive strip effects movements of the contact actuating spring and movable contact with snap action, said yoke means being movably connected to the bimetallic strip and secured in position on the projecting end of the contact actuating spring.

8. In a control device, the combination comprising, a pair of supports, a resilient metallic strip having a pair of oppositely disposed points thereon and an end projecting beyond one of said points, a pair of supports engaging said points to support the strip, the portion of said strip between the supports being flexed by the force exerted against the points by the supports, reinforcing means for rigidifying the projecting end of the strip, and means engaging the projecting end of the strip for effecting movement of the flexed portion of the strip to positions on either side of a center line of movement of the flexed portion.

9. In a control device, the combination comprising, a pair of spaced and substantially parallel bimetallic strips disposed in side by side relation and having adjacent portions adapted to flex in the same directions in response to temperature changes, and contact actuating means including a yoke fixed in position on said contact actuating means, said yoke having bifurcated ends loosely fitting over opposite sides of the portions of each of the bimetallic strips which are adapted to flex.

10. In a control device, the combination comprising, a pair of spaced and substantially parallel bimetallic strips having adjacent portions adapted to flex in response to temperature changes, contact actuating means, and a yoke fixed in position on said contact actuating means, said yoke having bifurcated ends engaging opposite sides of the portions of each of the bimetallic strips which are adapted to flex, the bifurcations in said ends being substantially C-shaped and the portions of the yoke which engage the strips being small.

11. In a control device, the combination comprising, a pair of bimetallic strips having adjacent portions adapted to flex in response to temperature changes, contact actuating means, and a yoke connected to the contact actuating means, said yoke having substantially C-shaped slots therein providing tips engaging opposite sides of each of the strips, said tips each having curved surfaces to minimize contact area with the strips and prevent binding in movement.

12. In a control device, the combination comprising, a pair of bimetallic strips having adjacent portions adapted to flex in response to temperature changes, contact actuating means, a yoke connected to the contact actuating means, said yoke having substantially C-shaped slots therein providing tips engaging opposite sides of each of the strips, said tips each having curved surfaces to minimize contact area with the strips and prevent binding in movement, said yoke also having an opening therein, and adjustable means loosely disposed in said opening and adapted to engage the yoke upon movement thereof.

13. In a temperature control device, a movable contact, a relatively stationary contact, a resilient member for moving the movable contact with a snap action alternately into and from contact closing relation with respect to the stationary contact, a temperature responsive element for effecting the operation of said resilient member, a rockable means upon which said temperature responsive element is mounted, a slidable cam member provided with a cam surface and a manually operable portion for operating said cam member, and a spring biased arm extending from said rockable means into contact with said cam surface whereby upon movement of the cam member by said manually operable portion thereof said temperature responsive element can be adjusted for varying the operation of said resilient member.

ERNST WALTER RICKMEYER.
MARTIN B. GROUT.